United States Patent
Pujare et al.

(10) Patent No.: US 9,838,351 B2
(45) Date of Patent: Dec. 5, 2017

(54) METHOD AND SYSTEM FOR FEDERATION OF PROXY-BASED AND PROXY-FREE COMMUNICATIONS SYSTEMS

(75) Inventors: Sanjay Pujare, San Jose, CA (US); Saravanan Bellan, San Jose, CA (US); Yogesh Raina, Cupertino, CA (US); Farzin Khatib-Shahidi, Los Altos Hills, CA (US); Silvia Restelli, San Jose, CA (US)

(73) Assignee: Nextplane, Inc., Sunnyvale, CA (US)

( * ) Notice: Subject to any disclaimer, the term of this patent is extended or adjusted under 35 U.S.C. 154(b) by 141 days.

(21) Appl. No.: 13/367,232

(22) Filed: Feb. 6, 2012

(65) Prior Publication Data

US 2012/0203913 A1 Aug. 9, 2012

Related U.S. Application Data

(60) Provisional application No. 61/439,745, filed on Feb. 4, 2011.

(51) Int. Cl.
*G06F 15/16* (2006.01)
*H04L 12/58* (2006.01)
(Continued)

(52) U.S. Cl.
CPC ............ *H04L 51/36* (2013.01); *H04L 51/066* (2013.01); *H04L 63/062* (2013.01);
(Continued)

(58) Field of Classification Search
CPC ....................................................... G06F 15/16
(Continued)

(56) References Cited

U.S. PATENT DOCUMENTS 5,784,612 A 7/1998 Crane et al.
6,041,281 A 3/2000 Nimura et al.
(Continued)

FOREIGN PATENT DOCUMENTS

| EP | 1549024 A1 | 6/2005 |
|---|---|---|
| WO | 2002039237 | 5/2002 |
| WO | 2015054522 A1 | 4/2015 |

OTHER PUBLICATIONS

International Search Report and Written Opinion for Application No. PCT/US12/24014, dated May 23, 2012, 8 pp.
(Continued)

*Primary Examiner* — Vivek Srivastava
*Assistant Examiner* — Sibte Bukhari
(74) *Attorney, Agent, or Firm* — Steptoe & Johnson LLP (57) ABSTRACT

A method and system for federation of proxy-based and proxy-free communications systems is disclosed. In one embodiment, a computer-executable method comprises broadcasting a network address of a federation computer with an identification of the federation computer as a server for domains operating on a proxy-less protocol. The method includes establishing communications with a server on the network according to a proxy-less communications protocol to receive data bound for a destination domain that operates according to a proxy-based communications protocol and to receive data bound for a destination domain that operates according to a proxy-less communications protocol. Further, the method calls for establishing communications with a proxy on the network according to a proxy-based protocol to receive data bound for a destination domain.

24 Claims, 7 Drawing Sheets

(51) Int. Cl.
*H04L 29/06* (2006.01)
*H04L 29/08* (2006.01)

(52) U.S. Cl.
CPC ........ *H04L 63/0823* (2013.01); *H04L 63/166* (2013.01); *H04L 67/28* (2013.01)

(58) Field of Classification Search
USPC .................................................. 709/227–229
See application file for complete search history.

(56) References Cited

U.S. PATENT DOCUMENTS

| | | | |
|---|---|---|---|
| 6,065,016 A | 5/2000 | Stuntebeck et al. | |
| 6,208,986 B1 | 3/2001 | Schneck et al. | |
| 6,298,128 B1 | 10/2001 | Ramey et al. | |
| 6,418,200 B1 | 7/2002 | Ciccolella et al. | |
| 6,463,056 B1 | 10/2002 | Silva et al. | |
| 6,591,291 B1 | 7/2003 | Gabber et al. | |
| 6,654,759 B1 | 11/2003 | Brunet et al. | |
| 6,665,378 B1 | 12/2003 | Spielman et al. | |
| 6,738,462 B1 | 5/2004 | Brunson | |
| 6,892,245 B1 | 5/2005 | Crump et al. | |
| 7,051,114 B1 | 5/2006 | Ravishankar et al. | |
| 7,269,432 B2 | 9/2007 | Gress et al. | |
| 7,443,961 B2 | 10/2008 | Schroeder et al. | |
| 7,558,827 B2 | 7/2009 | Kawashima et al. | |
| 7,577,132 B2 | 8/2009 | Katz et al. | |
| 7,697,924 B2 | 4/2010 | Caspi et al. | |
| 7,698,398 B1 | 4/2010 | Lai | |
| 7,706,266 B2* | 4/2010 | Plamondon | 370/230 |
| 7,739,333 B2 | 6/2010 | Serr et al. | |
| 7,953,979 B2 | 5/2011 | Borneman et al. | |
| 8,145,719 B2* | 3/2012 | Barman | G06Q 10/10 709/206 |
| 8,200,758 B2 | 6/2012 | Serr et al. | |
| 8,359,357 B2 | 1/2013 | Rodriguez et al. | |
| 8,380,661 B2 | 2/2013 | Richards et al. | |
| 8,970,553 B2 | 3/2015 | Park et al. | |
| 9,077,726 B2 | 7/2015 | Pujare et al. | |
| 9,203,799 B2 | 12/2015 | Bellan et al. | |
| 9,241,012 B2 | 1/2016 | De Castro, Jr. et al. | |
| 2002/0037074 A1 | 3/2002 | Dowens et al. | |
| 2002/0083183 A1 | 6/2002 | Pujare et al. | |
| 2002/0087704 A1 | 7/2002 | Chesnais et al. | |
| 2002/0124057 A1 | 9/2002 | Besprosvan | |
| 2002/0157089 A1 | 10/2002 | Patel et al. | |
| 2003/0018725 A1 | 1/2003 | Turner et al. | |
| 2003/0149781 A1 | 8/2003 | Yared et al. | |
| 2004/0083297 A1 | 4/2004 | Gazzetta et al. | |
| 2005/0022006 A1 | 1/2005 | Bass et al. | |
| 2005/0047438 A1 | 3/2005 | Sylvain et al. | |
| 2005/0102513 A1 | 5/2005 | Alve | |
| 2005/0175021 A1 | 8/2005 | Ozugur et al. | |
| 2005/0288961 A1 | 12/2005 | Tabrizi | |
| 2006/0021017 A1 | 1/2006 | Hinton et al. | |
| 2006/0021019 A1 | 1/2006 | Hinton et al. | |
| 2006/0053384 A1 | 3/2006 | La Fetra et al. | |
| 2006/0120362 A1 | 6/2006 | Westman et al. | |
| 2006/0128409 A1 | 6/2006 | Gress et al. | |
| 2006/0136990 A1 | 6/2006 | Hinton et al. | |
| 2006/0205434 A1 | 9/2006 | Tom et al. | |
| 2006/0230124 A1 | 10/2006 | Belfiore et al. | |
| 2007/0011245 A1 | 1/2007 | Kawashima et al. | |
| 2007/0130343 A1 | 6/2007 | Pardo-Blazquez et al. | |
| 2007/0136603 A1 | 6/2007 | Kuecuekyan | |
| 2007/0202897 A1 | 8/2007 | Smith | |
| 2007/0234417 A1 | 10/2007 | Blakley, III et al. | |
| 2007/0285503 A1 | 12/2007 | Asthana et al. | |
| 2008/0010665 A1 | 1/2008 | Hinton et al. | |
| 2008/0021997 A1 | 1/2008 | Hinton | |
| 2008/0032695 A1 | 2/2008 | Zhu et al. | |
| 2008/0072301 A1 | 3/2008 | Chia et al. | |
| 2008/0082662 A1* | 4/2008 | Dandliker et al. | 709/225 |
| 2008/0086564 A1 | 4/2008 | Putman et al. | |
| 2008/0144896 A1 | 6/2008 | Burke | |
| 2008/0215694 A1 | 9/2008 | Chen et al. | |
| 2008/0215717 A1 | 9/2008 | Zhou et al. | |
| 2008/0219223 A1 | 9/2008 | Bienas et al. | |
| 2008/0320576 A1 | 12/2008 | Curling | |
| 2009/0006076 A1 | 1/2009 | Jindal | |
| 2009/0019115 A1 | 1/2009 | Larson et al. | |
| 2009/0019367 A1 | 1/2009 | Cavagnari et al. | |
| 2009/0049190 A1 | 2/2009 | Jiang et al. | |
| 2009/0049202 A1 | 2/2009 | Pattison et al. | |
| 2009/0077251 A1 | 3/2009 | Brown et al. | |
| 2009/0089625 A1 | 4/2009 | Kannappan et al. | |
| 2009/0094336 A1 | 4/2009 | Echevarria et al. | |
| 2009/0100289 A1 | 4/2009 | Chen et al. | |
| 2009/0119763 A1 | 5/2009 | Park et al. | |
| 2009/0138615 A1 | 5/2009 | Cristallo et al. | |
| 2009/0150905 A1 | 6/2009 | Lin et al. | |
| 2009/0172776 A1 | 7/2009 | Makagon et al. | |
| 2009/0177735 A1 | 7/2009 | Algie et al. | |
| 2009/0180602 A1 | 7/2009 | Ramanathan et al. | |
| 2009/0210496 A1 | 8/2009 | Shaffer et al. | |
| 2009/0276840 A1 | 11/2009 | Cao et al. | |
| 2009/0292814 A1 | 11/2009 | Ting et al. | |
| 2009/0307327 A1 | 12/2009 | Malik et al. | |
| 2009/0319672 A1* | 12/2009 | Reisman | 709/227 |
| 2009/0327419 A1 | 12/2009 | Serr et al. | |
| 2009/0327441 A1 | 12/2009 | Lee et al. | |
| 2009/0327868 A1 | 12/2009 | Tsukikawa | |
| 2010/0017598 A1 | 1/2010 | Rodriguez et al. | |
| 2010/0057851 A1 | 3/2010 | Ionescu et al. | |
| 2010/0058120 A1 | 3/2010 | Coleman et al. | |
| 2010/0100925 A1 | 4/2010 | Hinton | |
| 2010/0162374 A1* | 6/2010 | Nair | 726/7 |
| 2010/0205664 A1 | 8/2010 | Serr et al. | |
| 2010/0223334 A1 | 9/2010 | Narayanan et al. | |
| 2010/0251158 A1 | 9/2010 | Geppert et al. | |
| 2010/0287226 A1 | 11/2010 | Wright et al. | |
| 2010/0290611 A1 | 11/2010 | Ramanathan et al. | |
| 2011/0035443 A1 | 2/2011 | Jensen | |
| 2011/0138028 A1 | 6/2011 | Katz et al. | |
| 2011/0179180 A1 | 7/2011 | Schleifer et al. | |
| 2011/0231473 A1 | 9/2011 | Narayanan et al. | |
| 2011/0231919 A1 | 9/2011 | Vangpat et al. | |
| 2011/0238761 A1 | 9/2011 | Mizokami | |
| 2011/0271332 A1 | 11/2011 | Jones et al. | |
| 2011/0304686 A1 | 12/2011 | Qiu et al. | |
| 2011/0314014 A1 | 12/2011 | Junginger et al. | |
| 2012/0008753 A1 | 1/2012 | Burnett et al. | |
| 2012/0036566 A1 | 2/2012 | Nicholson et al. | |
| 2012/0084254 A1 | 4/2012 | Richards et al. | |
| 2012/0163577 A1 | 6/2012 | Buford et al. | |
| 2012/0180105 A1 | 7/2012 | Downes et al. | |
| 2012/0185391 A1 | 7/2012 | Sirota | |
| 2012/0190325 A1 | 7/2012 | Abu-Hakima et al. | |
| 2012/0203913 A1 | 8/2012 | Pujare et al. | |
| 2012/0216267 A1 | 8/2012 | Austel et al. | |
| 2012/0254326 A1 | 10/2012 | Bellan et al. | |
| 2012/0254373 A1 | 10/2012 | Pujare et al. | |
| 2012/0274725 A1 | 11/2012 | Robertson | |
| 2012/0303672 A1 | 11/2012 | Anand et al. | |
| 2013/0007150 A1 | 1/2013 | Hertz et al. | |
| 2013/0065618 A1 | 3/2013 | Long et al. | |
| 2013/0066871 A1 | 3/2013 | Fletcher et al. | |
| 2013/0067365 A1 | 3/2013 | Shrufi et al. | |
| 2013/0132285 A1 | 5/2013 | Richards et al. | |
| 2013/0151709 A1 | 6/2013 | Luna | |
| 2013/0160105 A1 | 6/2013 | Huang et al. | |
| 2013/0198386 A1 | 8/2013 | Srikanth et al. | |
| 2013/0246640 A1 | 9/2013 | Ahrens | |
| 2013/0268920 A1 | 10/2013 | Ursal et al. | |
| 2014/0148934 A1 | 5/2014 | Manley et al. | |
| 2014/0280931 A1 | 9/2014 | Braun et al. | |
| 2014/0280932 A1 | 9/2014 | Braun et al. | |
| 2014/0282816 A1 | 9/2014 | Xie et al. | |
| 2014/0282934 A1 | 9/2014 | Miasnik et al. | |
| 2014/0289303 A1 | 9/2014 | Tarricone et al. | |

(56) References Cited

U.S. PATENT DOCUMENTS

2014/0337954 A1 11/2014 Ahmed et al.
2014/0359027 A1 12/2014 Pujare et al.
2015/0032700 A1 1/2015 Mermelstein

OTHER PUBLICATIONS

Beuchelt, G., et al., "RESTful Services Guidance for Developers v 1.0", MITRE Technical Report MTR100093, Apr. 2010, 46 pages.
Bogusz, Dariusz, et al., "Telco 2.0 for UC — an example of integration telecommunications service provider's SDP with enterprise UC system", FedCSIS 2012, Wroclaw, Poland, Sep. 9-12, 2012, pp. 603-606.
Bossoli, Francesca, et al.; "Proposal for Common Interoperability Protocol", Online, Aug. 30, 2003, pp. 1-3, XP002283230.
"Chapter 21—Voice Messaging", Cisco Unififed Communications System Description—Release 9.0 SRND, Cisco Systems, Inc., San Jose, CA, Apr. 30, 2013, 44 pages.
"Cisco Unified Communications System Description Release 8.5(1)", Cisco Systems, Inc., San Jose, CA, (c) 2010, 90 pages.
Ennai, Anuraj, et al., "MobileSOA: A Service Oriented Web 2.0 Framework for Context-Aware, Lightweight and Flexible Mobile Applications", EDOCW 2008, Munich, Germany, Sep. 16, 2008, pp. 345-352.
Levy, Brian, "The common capability approach to new service development", BT Technology Journal, vol. 23, No. 1, Jan. 2005, pp. 48-54.
Microsoft Computer Dictionary, 5th Edition, Microsoft Press, Redmond, WA, (c) 2002, p. 16.
Microsoft Computer Dictionary, 5th Edition, Microsoft Press, Redmond, WA, (c) 2002, p. 474.
"Nimsoft® Monitor™Server, Getting Started Guide version 6.00" (Jun. 29, 2012 to Nimsoft), 46 pages.
"Office-LinX Cloud Connect Edition for Cisco Unity Connection", Esna Technologies, Inc., Richmond Hill, ON, Canada©2012, 2 pages.
PCT International Search Report issued Aug. 5, 2016 in corresponding PCT Application No. PCT/US2016/031304 filed May 6, 2016, inventor Bellan, Saravanan et al.
PCT International Search Report issued Aug. 26, 2016 in corresponding PCT Application No. PCT/US2016/031330 filed May 6, 2016, inventor Bellan, Saravanan et al.
PCT International Search Report issued Jan. 2, 2015 in corresponding PCT Application No. PCT/US2014/059944 filed Oct. 9, 2014, inventor Pujare, Sanjay et al.
PCT International Search Report issued Oct. 22, 2014 in corresponding PCT Application No. PCT/US2014/041595 filed May 9, 2014, inventor Pujare, Sanjay et al.
PCT International Search Report issued May 23, 2012 in corresponding PCT Application No. PCT/US2012/024014 filed Feb. 6, 2012, inventor Pujare, Sanjay et al.
"Representational state transfer", Wikipedia, downloaded from en.wikipedia.org/wiki/Representational_state_transfer on Feb. 2, 2015, pp. 1-5.
Supplementary European Search Report issued Aug. 20, 2014 in corresponding EP Application No. EP 11862613 filed Apr. 26, 2011, inventor Pujare, Sanjay et al.
Technical Specification "Interdomain Federation for IM and Presence Service on Cisco Unified Communications Manager, Release 9.0(1)", Cisco Systems, Inc., San Jose, CA, Jul. 18, 2012, 188 pages.
"Web Application Description Language", Wikipedia, downloaded from en.wikipedia.org/wiki/Web_Application_Description_Language on Feb. 2, 2015, pp. 1-3.

\* cited by examiner

METHOD AND SYSTEM FOR FEDERATION OF PROXY-BASED AND PROXY-FREE COMMUNICATIONS SYSTEMS

RELATED APPLICATIONS

Applicant claims priority to Application 61/439,745, filed on Feb. 4, 2011; and incorporates the entirety of Application 61/439,745 in this document by this reference.

FIELD

The present invention relates to unified communications (UC) systems, and more particularly, to providing a highly scalable system for interconnecting distinct and independent UC systems in a federated manner.

BACKGROUND

A unified communications (UC) system generally refers to a system that provides users with an integration of communications services. Users typically connect to the UC system through a single client to access the integrated communications services. The integrated communications services may include real-time services, such as instant messaging (IM), presence notifications, telephony, and video conferencing, as well as non-real-time services, such as email, SMS, fax, and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Currently, a number of third-party developers offer various UC applications for implementing UC systems. The various applications include Microsoft Office Communications Server (OCS), IBM Sametime (ST), Google Apps, and Cisco Jabber.

Often, a UC system needs to communicate with a different UC system. For example, a corporation or business that employs a particular UC system may desire to communicate externally with vendors or other persons who employ a different UC system. Or in the case of internal communication, when an organization that employs a particular UC system "A" merges with another organization that employs a UC system "B," the ability for users on system "A" to communicate with users on system "B" is often desirable.

Because there is no industry standard regarding UC systems, communications between different UC systems give rise to issues of incompatibility. These issues often make communication between the UC systems difficult or impossible to implement. One aspect of UC system incompatibility is whether or not systems attempting to communicate support proxies. If a UC system based on standards and protocols that do not accommodate proxies attempts to establish communications with a proxy-based system, the attempt will fail: the respective protocols to establish a connection will, in effect, talk past each other. For example, Cisco Jabber is not compatible with Microsoft OCS. The incompatibility is because Jabber is based on the Extensible Messaging and Presence Protocol ("XMPP"), which does not accommodate proxies, while Microsoft OCS is based on the Session Initiation Protocol ("SIP"), which does accommodate proxies.

Figure 1:
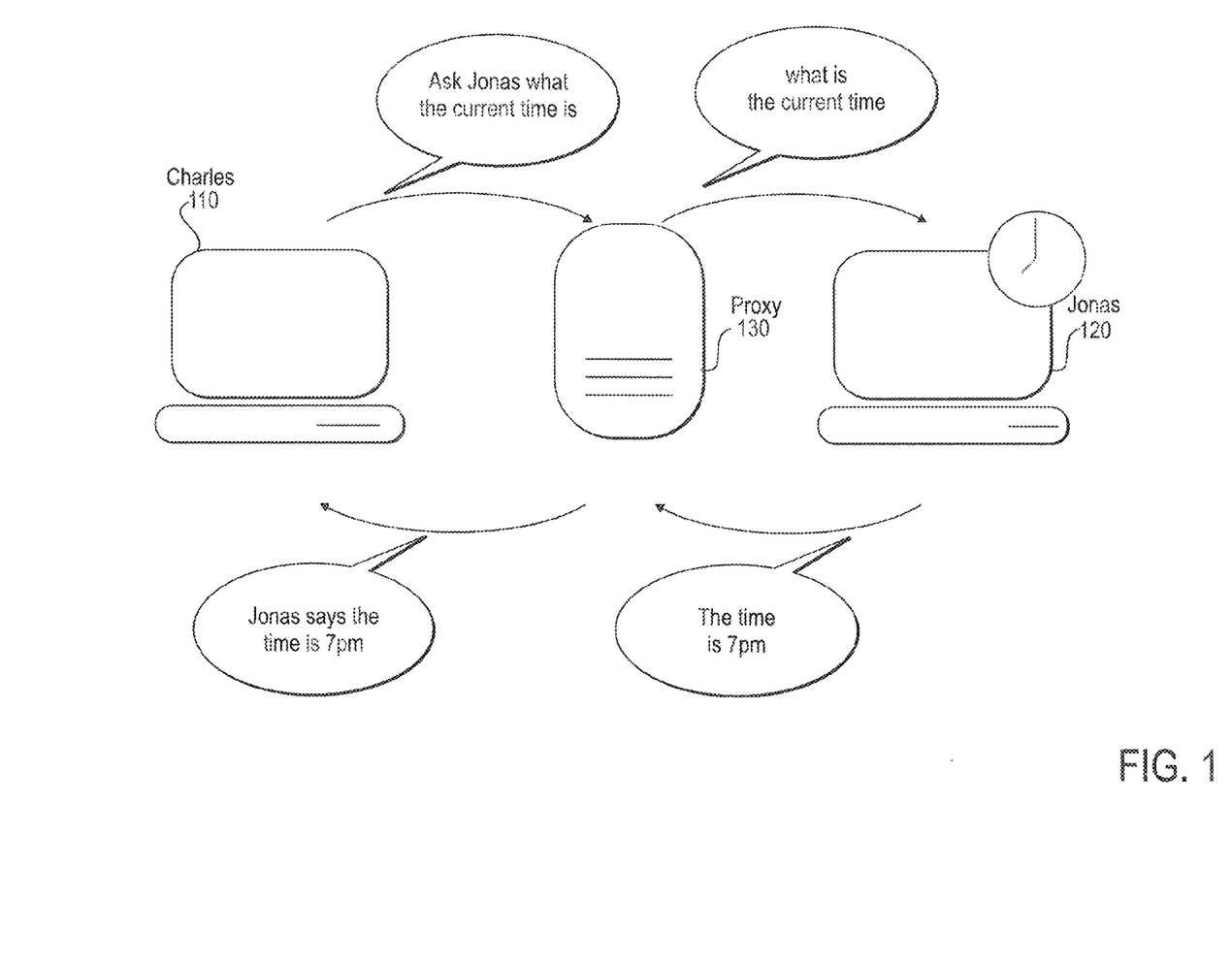
FIG. 1 is a diagram that illustrates the concept of a proxy.

FIG. 1 is a diagram that illustrates the concept of a proxy. In FIG. 1, Charles at computer 110 communicates with Jonas at computer 120 through proxy computer 130. Charles and Jonas do not communicate directly: computer 110 does not send message data to computer 120. Rather, proxy computer 130 is in communication with both computers 110 and 120, and acts as an intermediary.

Figure 2:
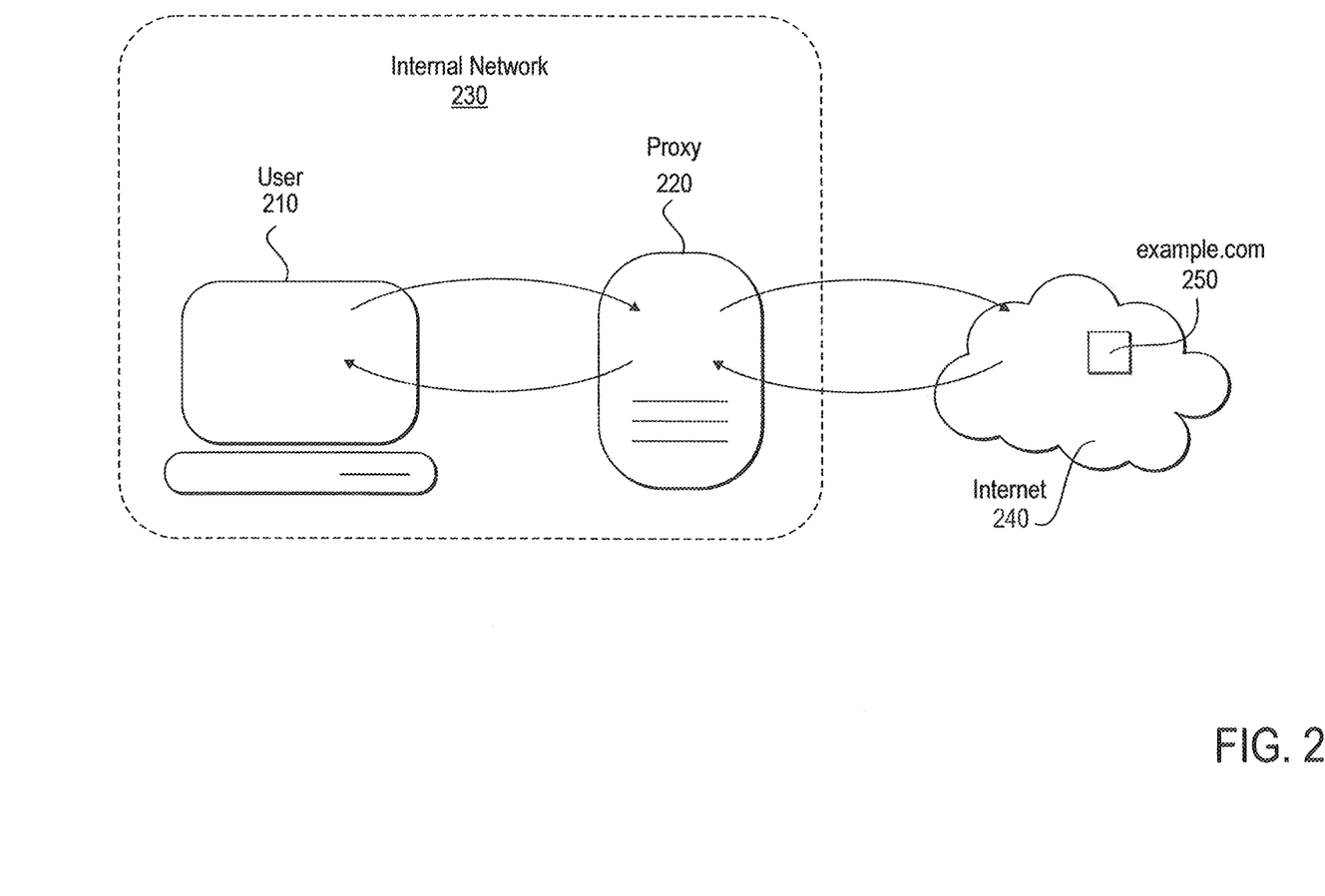
FIG. 2 is a diagram of a proxy in a networked environment that illustrates a conventional advantage of proxies.

FIG. 2 is a diagram of a proxy in a networked environment that illustrates a conventional advantage of proxies. In FIG. 2, user computer 210 and proxy computer 220 are elements of internal network 230. The internal network is in communication with Internet 240, including a domain 250 named example.com. A domain is a sub-network. As described in regard to FIG. 1, user computer 210 communicates outside of the internal network through the proxy computer: for example, there is no direct communication from the user computer to example.com. One advantage of using a proxy is that the proxy computer is a shield against external computers. In more complicated examples of networks (not shown), another advantage is that proxy computers enable complex routing schemes between various computers.

Figure 3:
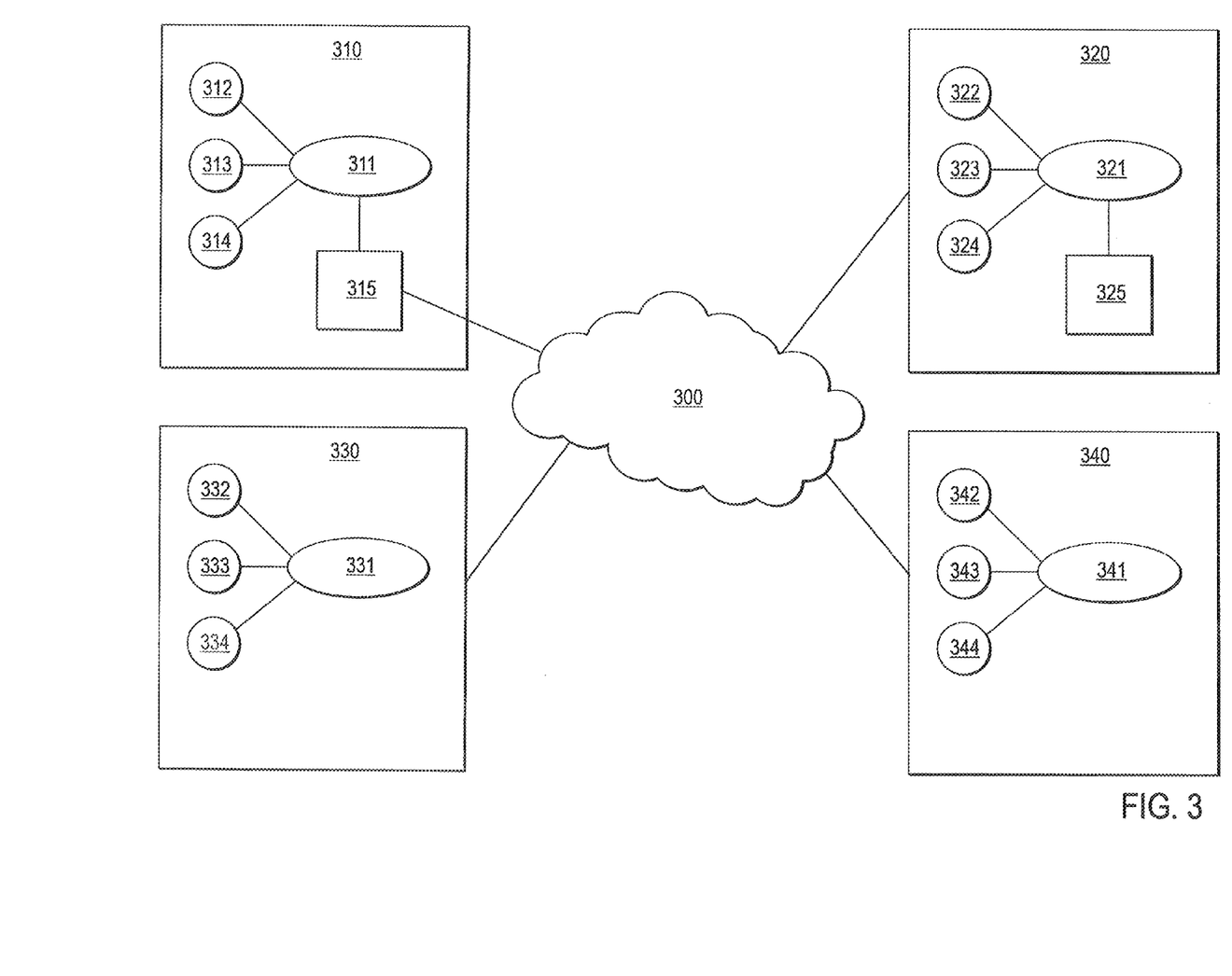
FIG. 3 is a diagram of a network topology that illustrates proxy-based protocol to proxy-free protocol communications.

FIG. 3 is a diagram of a network topology that illustrates the proxy-based protocol to proxy-free protocol communications problem. FIG. 3 shows domain 310, domain 320, domain 330, and domain 340 connected by network 300. Each domain includes a UC device; here, a server with multiple users. In the domain 310, UC server 311 has user_1 312, user_2 313 and user_3 314. Domain 310 also includes proxy computer 315, and runs Microsoft Office Communication Server (OCS). In the domain 320, website 321 has user_1 322, user_2 323 and user_3 324. Domain 320 includes one proxy computer 325, and runs Microsoft OCS. In domain 330, UC server 331 has user_1 332, user_2 333 and user_3 334 running Cisco Jabber. Domain 330 is proxy-free: it does not include a proxy computer. In domain 340, UC server 341 has user_1 342, user_2 343, user_3 344 running Cisco Jabber. Domain 340 is proxy free. In FIG. 3, users 312-314 can communicate with users 332-334 over the network, however, communication with users on domains 320 and 340 is problematic, if not impossible.

One conventional solution to the compatibility problem is a system-wide shift to one UC system or another. In the foregoing example of merging business entities using UC system "A" and "B," the merged organization can abandon one or the other UC system, and re-provision uniformly. In FIG. 3, users in domains 330 and 340 could abandon Cisco Jabber and adopt Microsoft OCS. But this can be expensive and in some cases impractical. Other conventional solutions are multi-protocol clients, or multi-protocol servers, or a gateway that receives communications entering a domain and translates syntax and semantics of an incompatible protocol into the syntax and semantics of a compatible protocol. But these solutions are lacking because they typically result in reduced usability of the UC system, or are not scalable, or rely on expensive added infrastructure. What is needed instead is a less expensive and scalable solution that allows for seamless federation between proxy-based and proxy-less systems.

SUMMARY

In one embodiment, a computer-executable method comprises broadcasting a network address of a federation computer with an identification of the federation computer as a server for domains operating on a proxy-less protocol. The method includes establishing communications with a server on the network according to a proxy-less communications protocol to receive data bound for a destination domain that operates according to a proxy-based communications protocol and to receive data bound for a destination domain that operates according to a proxy-less communications protocol. Further, the method calls for establishing communications with a proxy on the network according to a proxy-based protocol to receive data bound for a destination domain.

In an alternate embodiment a computer-executable method comprises broadcasting, over a computer network including a plurality of computers in network domains and a federation computer configured to send and receive data according to proxy-based and proxy-less protocols, a network address of the federation computer and an identification of the federation computer as a server for at least one domain configured according to a proxy-less communications protocol. This embodiment also calls for directing data traffic on the computer network to the federation computer based on the broadcast and a priority over another network-identified server for the destination domain, the priority established at an originating domain; and directing data traffic on the computer network to the federation computer based on an identification of the federation computer as a proxy computer at an originating domain.

In a further embodiment, a system, comprises a first network communications component and a second communications component. The first communications component is for sending and receiving data according to a proxy-less communications protocol and is configurable to connect between at least two computers on a network. In this, the first communications component receives data that has been routed to it over the network on the basis of the system identifying itself on the network as a server. The second communications component is for sending and receiving data according to a proxy-based communications protocol. The second communications component is configurable to interconnect between at least two computers. In this, the second communications component receives data that has been routed to it over a network on the basis of a message-originating server's considering the system to be a proxy. The embodiment also includes a managing component that is in communication with the first and second network components. The managing component is for directing data transfer between the components.

BRIEF DESCRIPTION OF THE DRAWINGS

Drawings, which are a portion of this specification, explain and teach aspects, advantages and novel features of the invention and facilitate the description of various embodiments, however, the drawings do not describe every aspect of the teachings disclosed herein and do not limit the scope of the claimed invention

These figures are not necessarily drawn to scale, and elements of similar structures or functions are generally represented by like reference numerals for illustrative purposes throughout the figures.

DETAILED DESCRIPTION

Figure 4:
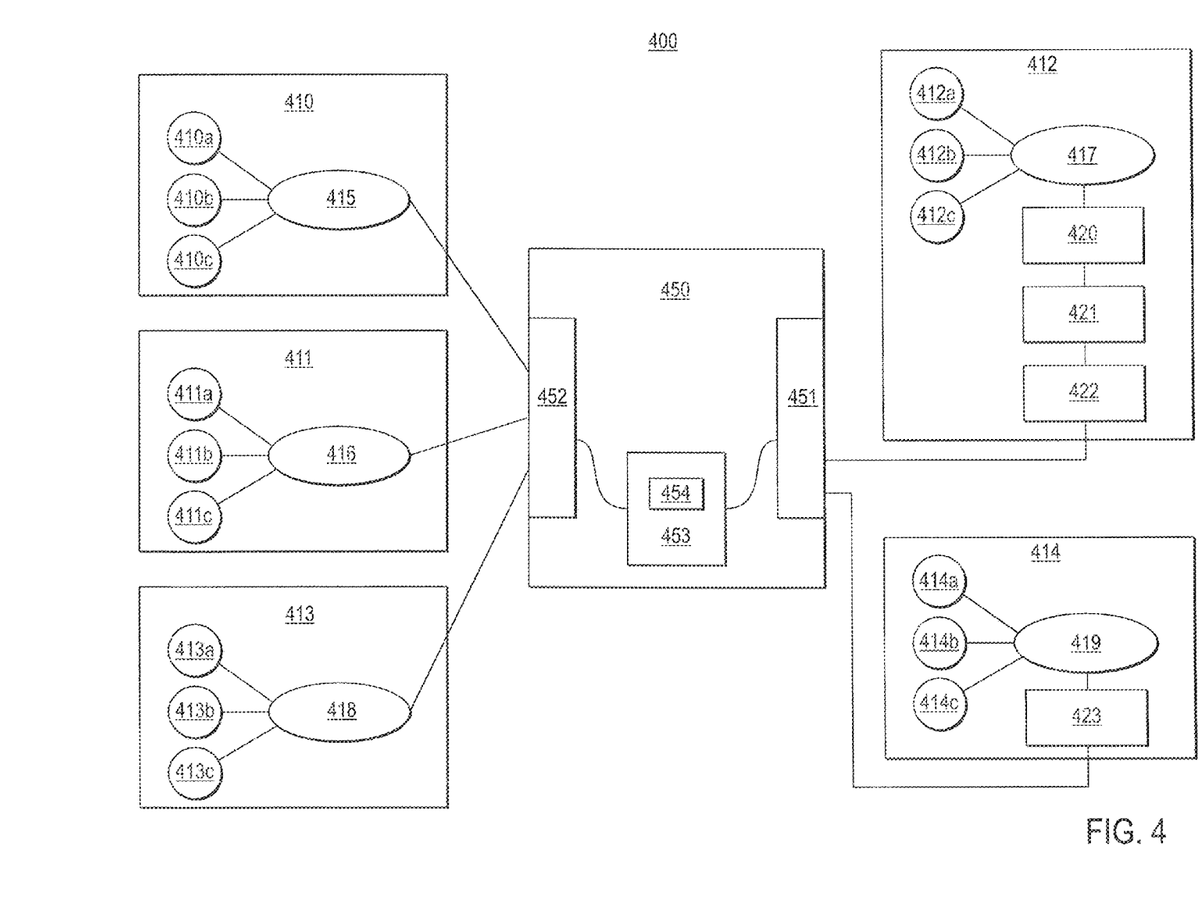
FIG. 4 is a diagram of a computer network that illustrates an exemplary embodiment of the present invention.

FIG. 4 is a diagram of a computer network that illustrates an exemplary embodiment of the present invention. In FIG. 4, computer network 400 includes domains 410-414, which in turn include server computers 415-419. Domains 412 and 414 include proxy computers. Domain 412 includes three proxy computers 420-422. Domain 414 includes one proxy computer 423. The server computers have respective users 410*a-c*, 411*a-c*, 412*a-c*, 413*a-c*, and 414*a-c*. Federation computer 450 is connected to the domains by, for example not limitation, wires or fiber optics or radio emissions or microwave emissions. Ordinary network devices such as routers have been omitted from the figure for the sake of clarity.

Federation computer 450 comprises a proxy-based connector 451, a proxy-free (typically server-to-server) connector 452, and message manager 453 which includes memory 454. The proxy-based connector establishes connections, sends, and receives data according to a proxy-based communications protocol. Similarly, the proxy-free connector establishes connections, sends, and receives data according to a proxy-free communications protocol. The message manager, amongst other functions, transfers data from one connector to the other, directly or through intermediate components such as a memory device (not shown).

Network 400 includes domains that send and receive messages according to proxy-based and proxy-free protocols. Because domains 412 and 414 include proxy computers, domains 412 and 414 run proxy-based communications protocols to forward data from an originating server in the domain to a destination. One example of a proxy-based communications protocol is the Session Initiation Protocol ("SIP"). Domains 410, 411, and 413 do not include proxy computers: they run proxy-free communications protocols under Which servers communicate with servers. One example of a proxy-free protocol is the Extensible Messaging and Presence Protocol ("XMPP"). In the exemplary embodiments that follow, a term-of-art, "server-to-server," substitutes for "proxy-free."

Embodiments of the invention enable any-to-any communication between domains operating on inconsistent proxy-based and proxy-free protocols by accommodating the inconsistent protocols. As a result, end users share presence information, send/receive instant messages, participate in multi-part text voice and video, as if all were served by the same UC protocol.

The accommodation has several aspects: In one aspect, federation computer 450 operates according to both protocols: the federation computer establishes connections, receives, and transmits data according to proxy-based and proxy-free protocols. In particular embodiments, when sending data to a server, federation computer 450 behaves as a server and communicates with connector 452 according to a server-to-server protocol, independent of whether the data was received according to the server-to-server protocol or a proxy-based protocol. When sending data to a proxy computer, the federation computer behaves as a proxy and communicates with connector 451 according to a proxy-based protocol, independent of whether the data was received according to a server-to-server protocol or the proxy-based protocol.

In another aspect, when originating a message, domains route data to the federation computer to accommodate any inconsistency between protocols of originating and destination domains. Domains route data to the federation computer responsive to the federation computer holding itself out to the network as a server, or a proxy, or a server and a proxy. In other embodiments domains route data to the federation computer based on a priority or identification established at the originating domain. Several illustrative examples follow:

Example 1: XMPP (Server-to-Server) Domain to SIP (Proxy-Based) Domain

With respect to FIG. 4, this example is for a user on domain 410 (XMPP) communicating with a user on domain 414 (SIP).

According to the invention, federation computer 450 identifies itself to network 400 as an XMPP server so that server 415 directs its message to the federation computer. More particularly, the federation computer broadcasts itself on the network as a server for the destination computer's domain. Broadcasting includes but is not limited to publication of records for network-wide lookup, such as publication of service (DNS SRV) records. In this example, the federation computer broadcasts its network address and an identification as a XMPP server for domain 414. This broadcast is accessible by devices over the network, in an otherwise conventional manner, including domains operating with the XMPP protocol. Server 415 on domain 410 (XMPP) looks-up a server for domain 414 (SIP) and determines, based on the broadcast, that federation computer 450 is an XMPP server. There is no other network broadcast of an XMPP server for the domain 414 because domain 414 is based on the SIP protocol, not the XMPP protocol. Server 415 and the federation computer then establish a connection based on the XMPP protocol and data transfers to the federation computer through connector 452.

In accord with the multiple protocol aspect of the invention, the federation computer determines the protocol for the destination domain, domain 414, opens a connection with proxy 423 in domain 414 based on the SIP protocol with connector 451, and transmits data to the recipient at server 419. Message manager 453 manages data flow between connector 451 and 452. Typically, though not necessarily, at least a portion of the data is stored in a memory, for example, a buffer memory.

Federation computer 450 determines the protocol for the destination domain according to any number of techniques: an otherwise conventional routing table which maps domains to proxies; a host file entry identifies proxy 423 as the destination for domain 414; or proxy 423 publishes itself on network 400 as the destination for domain 414.

In another example (not shown), federation computer 450, through connector 451, communicates with a single proxy for multiple domains or multiple servers.

Example 2: XMPP (Server-to-Server) Domain to XMPP (Server-to-Server) Domain

With respect to FIG. 4, this example is for a user on domain 410 (XMPP) communicating with a user on domain 413 (XMPP).

As described above, federation computer 450 broadcasts to network 400 that it is an XMPP server for one or more XMPP domains, such as domains 410-413. In an instance where data both originates at an XMPP domain, and is destined for an XMPP domain, there are two XMPP servers broadcast on the network; federation computer 450 and the destination domain XMPP server, for example servers 415-418 for their respective domains.

To direct the data to the federation computer, embodiments of the invention include a' priority, which is established at an originating domain. The priority orients the server in the originating domain to direct communications to the federation computer over any other network-published XMPP server for the destination domain.

In one exemplary embodiment, a server on the originating domain, for example server 415 in FIG. 4, has pointer data in memory. The pointer data orient server 415 to direct messages to the federation computer, rather than another published XMPP server for the destination domain, server 418. In other exemplary embodiments, a server on the originating domain has data in memory that prioritize network locations termed "hosts" over network locations based on look-ups of published network devices, and a data file entry that characterizes the federation computer and its network address as a host. Many variations are apparent to a skilled person.

Oriented by the priority established at an originating domain, server 415 establishes a connection with federation computer 450 with connector 452, according to the XMPP protocol, and transmits data to the federation computer.

In accord with the multiple protocol aspect of the invention, the federation computer determines the destination computer's communications protocol, which is XMPP. The determination is made, for example and not limitation, through published records (SRV records), or a routing table. The federation computer then, with connector 452, establishes communications with server 418 using the XMPP protocol and transmits the data.

Example 3: SIP (Proxy-Based) Domain to XMPP (Server-to-Server) Domain

With respect to FIG. 4, this example is for a user on domain 412 (SIP) communicating with a user on domain 411 (XMPP).

Embodiments of the invention orient data originating from SIP domains, for example originating from domain 412, to federation computer 450 by identifying the federation computer as a proxy at the originating domain. Identified as a proxy, the network-interfacing proxy in domain 412, proxy 422, and the federation computer establish a connection and transfer data with connector 451 according to the SIP protocol.

In alternate embodiments, federation computer 450 orients data from SIP domains to connector 451 by publishing itself as a destination for SIP domains. The network-interfacing proxy in domain 412, proxy 422, and the federation computer establish a connection and transfer data with connector 451 according to the SIP protocol.

In accord with the multiple protocol aspect of the invention, the federation computer determines the destination computer's communications protocol, which is XMPP. The determination is made, for example and not limitation, through published records (SRV records), or a routing table. The federation computer then, with connector 452, establishes communications with the destination server, server 416, and transmits data to the destination computer according to the XMPP protocol.

Example 4: SIP (Proxy-Based) Domain to SIP (Proxy-Based) Domain

With respect to FIG. 4, this example is for a user on domain 412 (SIP) communicating with a user on domain 414 (SIP).

Communications from a SIP domain to a SIP domain are as in Example 3, except that federation computer 450, having determined that the destination computer operates on the SIP protocol, establishes a connection with connector 451 and transmits data to the destination computer through proxy 423 according to the SIP protocol. In this case, the federation computer acts as a destination proxy for domain 412 and a source proxy for domain 414.

The foregoing examples and description are discrete. In typical applications, federation computer 450 establishes concurrent communications of the different types described above (XMPP-SIP; XMPP-XMPP; SIP-XMPP; and SIP-SIP). That is, the federation computer supports real time, seamless, any-to-any communications presence.

Figure 5:
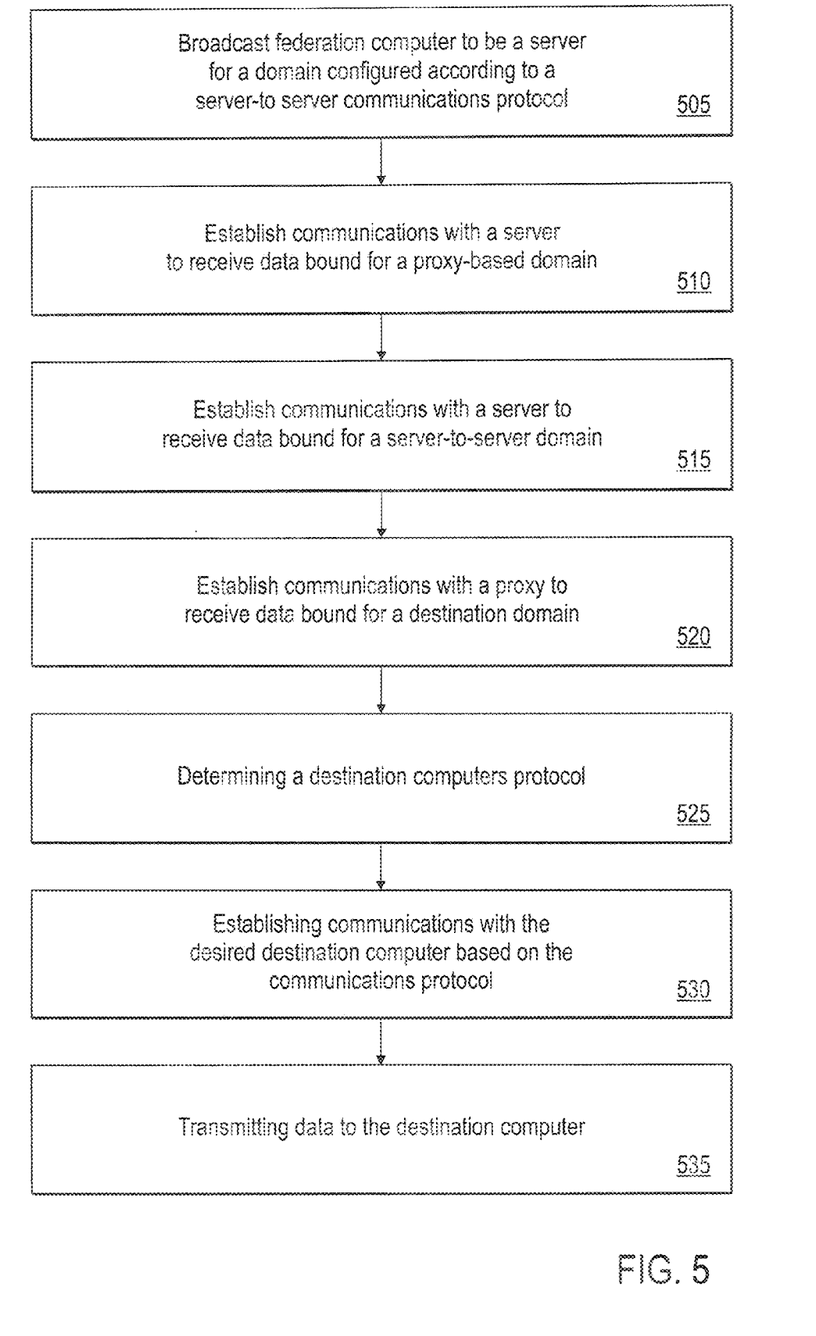
FIG. 5 is a flow chart that synthesizes examples based on FIG. 4.

FIG. 5 is a flow chart that illustrate a synthesis of discrete foregoing examples. A method executed by the federation computer includes, at block 505, the federation computer broadcasting over network 400 its network address along with an identification of itself as a server for one or more XMPP domains. At block 510, the federation computer establishes communications with a server on network 400 according to the XMPP protocol in order to receive data bound for a SIP domain. The originating XMPP server directed the data to the federation computer responsive to the federation computer's broadcast. At block 515, the federation computer establishes communications with a server on network 400 according to the XMPP protocol in order to receive data bound for a XMPP domain. The originating XMPP server directed the data to the federation computer responsive to the federation computer's broadcast and a priority over other XMPP servers which was established at the originating domain. At block 520, the federation computer establishes communications with a proxy according to the SIP protocol and receives data bound for SIP or XMPP domains. The proxy directed the data to the federation computer responsive to the federation computer broadcasting itself as a proxy, or because the originating domain otherwise identified the federation computer as a proxy, for example by pre-configuration.

Then, at each instance of a received message, and in accord with the multiple protocol aspect of the invention, at block 525, the federation computer determines the protocol for the destination computer. The determination is made, for example and not limitation, through published records (SRV service records), or a routing table. In block 530, the federation computer establishes communications with the destination computer based on the destination computer's protocol. In block 535, the federation computer transmits data to the destination computer according to the destination computer's protocol.

Figure 6:
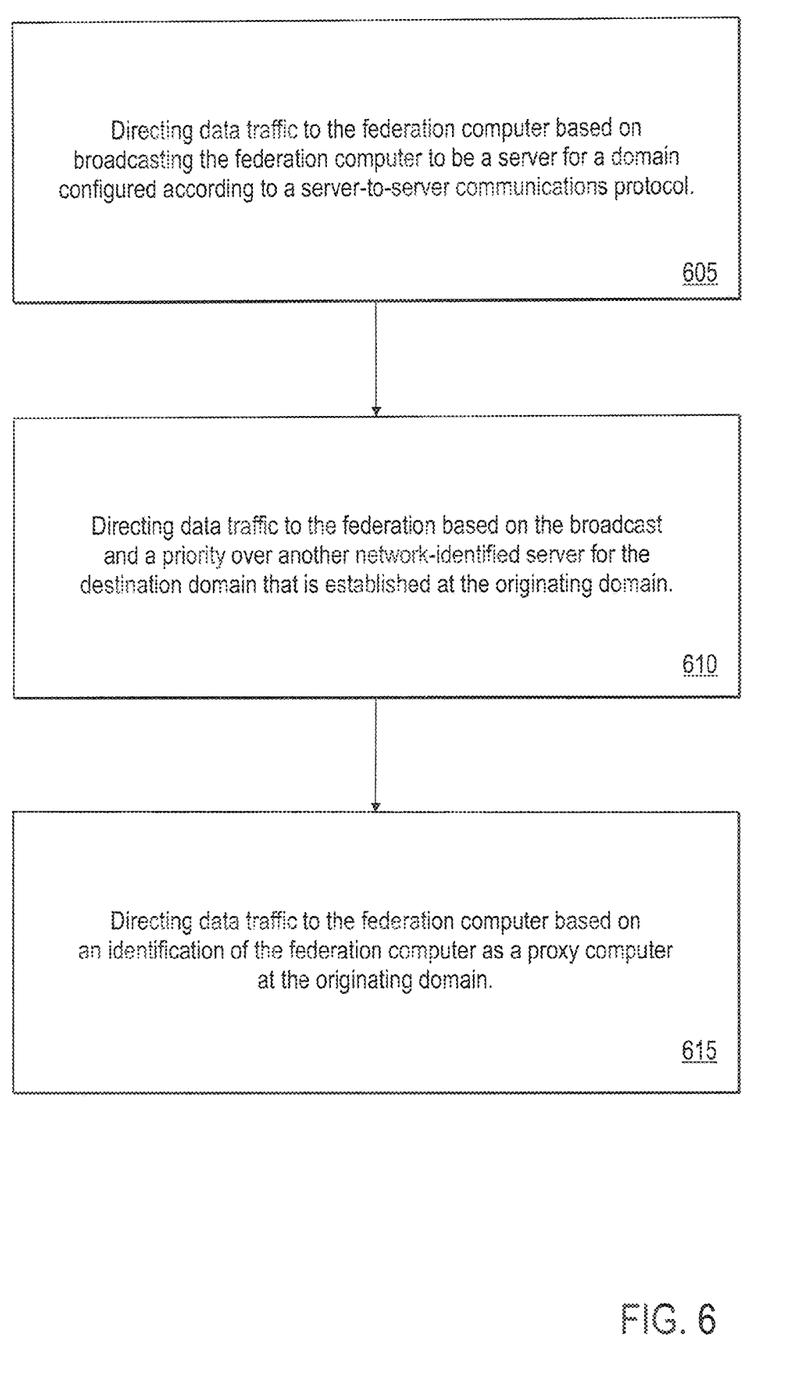
FIG. 6 is a flow chart that illustrates a method for directing data to a multi-protocol federation computer.

FIG. 6 is a flow chart that illustrates a method for directing data to a multi-protocol federation computer, such as the federation computer described in reference to FIG. 4. According to the method at block 605, data traffic is directed to the federation computer by broadcasting the federation computer to be a server for a domain that's configured according to a proxy-less protocol, such as XMPP. Originating XMPP domains direct traffic to the federation computer responsive to the broadcast, for example by doing a network device look-up. According to the method at block 610, data traffic is also directed to the federation computer based on the broadcast, and a priority over other network-identified servers that is established at the originating domain. For example, an XMPP domain will send data to the federation computer instead of another published XMPP server based on the priority set at the originating domain.

And according to the method at block 615, data traffic is also directed to the federation computer based on an identification, at the originating domain, of the federation computer as a proxy computer. For example, identifying the federation computer as a proxy at SIP domains will direct data to the federation computer.

Security and encrypted communications are important features in a UC system. In the context of otherwise conventional transport layer security (TLS) communications, the aforementioned compatibility problem between proxy-based and proxy-free protocols is present. A proxy-based system, such as SIP, accepts certificates of intermediate proxies because the system attempts to match the domain name in the certificate with the fully qualified domain name (FQDN) of the proxy the system is connected to rather than the destination domain of the message. In contrast, a proxy-free system, such as XMPP, requires that it directly deliver the message to the destination domain's server: it attempts to match the domain name in a presented certificate with the destination domain of the message.

In different embodiments, data transfers to and from the federation computer are unencrypted, or encrypted with otherwise conventional security protocols such as TLS. Typically, embodiments of federation computer 450 (FIG. 4) have memory 454 for storing security certificates and cryptography keys for domains to implement TLS, and implementation is selective.

In an exemplary embodiment with TLS, memory 454 includes information for each domain served by the federation computer. For each domain participating in TLS secure communications, memory 454 stores a valid certificate, such as certificates issued by VeriSign, Inc. of Reston Va., a valid public cryptography key, and a valid private cryptography key. Memory 454 also stores an association between domains, and the protocol of the domain (for example, SIP or XMPP for a particular domain). Memory 454 also may store associations between a domain and its FQDN record and a service (SRV) record. In other embodiments, rather than store FQDN or SRV records, the federation computer performs a lookup of the records on the network. With memory 454 being a repository for certificates and keys of participating domains, the federation computer can establish TLS communications with every participating domain, presenting itself as a destination domain. Without the certificates communication can still occur, but without TLS.

Figure 7:
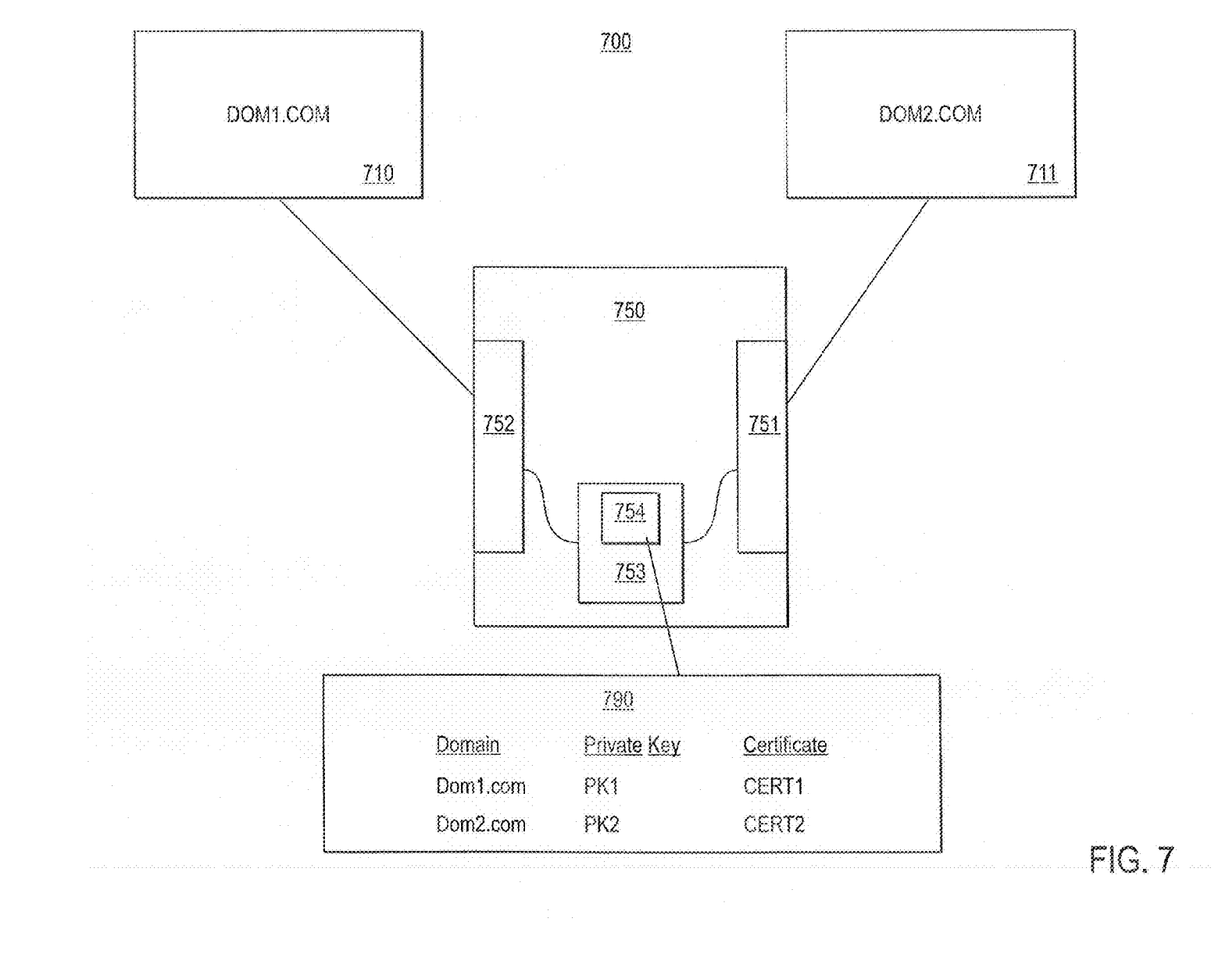
FIG. 7 is a diagram of a computer network that illustrates an exemplary embodiment with transport layer security.

FIG. 7 is a diagram of a computer network that illustrates an exemplary embodiment with TLS. In FIG. 7 and FIG. 4, similar elements have similar numbering. Network 700 includes domains 710, 711. Federation computer 750 is connected to the domains by, for example not limitation, wires or fiber optics or radio emissions or microwave emissions. As in FIG. 4, ordinary network devices such as routers have been omitted from the figure for the sake of clarity.

Federation computer 750 comprises a proxy-based connector 751, a proxy-free connector 752, and message manager 753, which includes memory 754. In different embodiments, memory is in other locations in the federation computer. Many devices and locations are possible. Memory 754 includes TLS information 790, which includes but is not limited to domain names and associated private cryptographic keys and certificates. In FIG. 7, domain 710, Dom1.com, has private cryptograph key PK1, and certificate CERT1. Likewise, domain 720, Dom2.com, has private cryptograph key PK2, and certificate CERT2. In accord with conventional Public Key Infrastructure (PKI), certificates CERT1 and CERT2 include signed public cryptographic keys which correspond to private cryptographic keys PK1 and PK2.

In one scenario, domain DOM1.com attempts to federate with domain DOM2.com. DOM1.com operates under a proxy-free protocol. As described above in foregoing examples, domain DOM1.com directs data to federation computer 450 after determining that the federation computer is a server for domain DOM2.com. After receiving data indicating that domain DOM2.com is the destination domain, the federation computer retrieves certificate CERT2 and private key PK2 from memory 754. The federation computer then presents CERT2 to domain DOM1.com, which authenticates the federation computer as the authorized server for DOM2.com. The federation computer then uses private cryptography key PK2 to encrypt and decrypt data in DOM1.com-federation computer communications.

A method and system for federation of proxy-based and proxy-free communications systems is disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A computer-executable method, comprising:
   enabling two-way communication between a plurality of domains operating on proxy-less communication protocols and proxy-based communication protocols;
   receiving by a federation computer first data from an originating server on a first originating domain operating according to a first proxy-less communication protocol, using a first connector and the first proxy-less communications protocol, wherein the federation computer is operating as a server on behalf of a first destination domain that operates according to a first proxy-based communications protocol;
   receiving second data by the federation computer from an originating proxy on a second originating domain operating according to a second proxy-based communication protocol, using a second connector and the second proxy-based communications protocol, wherein the federation computer is operating as a destination proxy on behalf of a second destination domain that operates according to a second proxy-less communications protocol;
   transmitting the first data by the federation computer to the first destination domain using the second connector and the first proxy-based communications protocol; and
   transmitting the second data by the federation computer to the second destination domain using the first connector and the second proxy-less communications protocol,
   wherein during the transmission of the first data and the second data, the federation computer operates according to both proxy-based and proxy-less communication protocols, and
   a message manager of the federation computer manages data flow between the first connector and the second connector through a memory device, wherein at least a portion of the first data and the second data are stored in the memory.

2. The computer-executable method of claim 1, further including
   transmitting the first data to a third destination domain using the first proxy-less communications protocol.

3. The computer-executable method of claim 1, further including transmitting the second data to a fourth destination domain using the second proxy-based communications protocol.

4. The computer-executable method of claim 1, further including storing at least a portion of one or more of the first data and the second data.

5. The computer-executable method of claim 1, wherein receiving the first data and receiving the second data includes establishing transport layer security.

6. The computer-executable method of claim 5, wherein establishing transport layer security comprises:
   determining a destination domain for a message from an originating domain;
   retrieving a stored security certificate for the destination domain from a plurality of stored security certificates, each security certificate in the plurality of stored security certificates associated with a domain on a network and a private cryptographic key; and
   presenting the stored security certificate to the originating domain.

7. The computer-executable method of claim 1, wherein transmitting the first data and transmitting the second data includes establishing transport layer security.

8. The computer-executable method of claim 1, wherein transmitting the first data and transmitting the second data includes selectively establishing transport layer security based on evaluating security certificates stored in a memory.

9. The computer-executable method of claim 1, wherein one or more of the first proxy-less communications protocol and the second proxy-less communications protocol is Extensible Messaging and Presence Protocol and one or more of the first proxy-based communications protocol and the second proxy-based communications protocol is Session Initiating Protocol.

10. The computer-executable method of claim 2, further comprising
    receiving the first data from the originating server based on operating as a priority over the third destination domain, wherein the priority is established at the originating server.

11. The computer-executable method of claim 10, wherein the priority established at the originating server comprises a pointer to the federation computer.

12. The computer-executable method of claim 10, wherein the priority established at the originating server includes prioritization of hosts over network look-ups, and a host file entry that points to the federation computer.

13. A system, comprising:
    an originating server on a first originating domain operating according to a first proxy-less communications protocol;
    an originating proxy on a second originating domain operating according to a second proxy-based communications protocol; and
    a federation computer that:
    enables two-way communication between a plurality of domains operating on proxy-less communication protocols and proxy-based communication protocols,
    receives first data from the originating server on the first originating domain operating according to the first proxy-less communications protocol, using a first connector and the first proxy-less communications protocol, wherein the federation computer is operating as a destination server on behalf of a first destination domain that operates according to a first proxy-based communications protocol;

receives second data from the originating proxy on the second originating domain operating according to the second proxy-based communications protocol, using a second connector and the second proxy-based communications protocol, wherein the federation computer is operating as a destination proxy on behalf of a second destination domain that operates according to a second proxy-less communications protocol;

transmits the first data to the first destination domain using the second connector and the first proxy-based communications protocol; and transmits the second data to the second destination domain using the first connector and the second proxy-less communications protocol, wherein during the transmission of the first data and the second data, the federation computer operates according to both proxy-based and proxy-less communication protocols, and a message manager of the federation computer manages data flow between the first connector and the second connector through a memory device, wherein at least a portion of the first data and the second data are stored in the memory.

14. The system of claim 13, wherein the federation computer transmits the first data to a third destination domain using the first proxy-less communications protocol.

15. The system of claim 13, wherein the federation computer transmits the second data to a fourth destination domain using the second proxy-based communications protocol.

16. The system of claim 13, wherein the federation computer stores at least a portion of one or more of the first data and the second data.

17. The system of claim 13, wherein the federation computer receives the first data and receives the second data further comprises the federation computer establishes transport layer security.

18. The system of claim 17, wherein the federation computer establishes transport layer security further comprises the federation computer:

determines a destination domain for a message from an originating domain;

retrieves a stored security certificate for the destination domain from a plurality of stored security certificates, each security certificate in the plurality of stored security certificates associated with a domain on a network and a private cryptographic key; and presents the stored security certificate to the originating domain.

19. The system of claim 13, wherein the federation computer transmits the first data and transmits the second data further comprises the federation computer establishes transport layer security.

20. The system of claim 13, wherein the federation computer transmits the first data and transmits the second data further comprises the federation computer selectively establishes transport layer security based on an evaluation of security certificates stored in a memory.

21. The system of claim 13, wherein one or more of the first proxy-less communications protocol and the second proxy-less communications protocol is Extensible Messaging and Presence Protocol and one or more of the first proxy-based communications protocol and the second proxy-based communications protocol is Session Initiating Protocol.

22. The system of claim 14, wherein the federation computer receives the first data from the originating server is further based on the federation computer operates as a priority over the third destination domain, wherein the priority is established at the originating server.

23. The system of claim 22, wherein the priority established at the originating server comprises a pointer to the federation computer.

24. The system of claim 22, wherein the priority established at the originating server includes prioritization of hosts over network look-ups, and a host file entry that points to the federation computer.

* * * * *